United States Patent [19]

Matz

[11] Patent Number: 4,536,292

[45] Date of Patent: Aug. 20, 1985

[54] CARBOXYLIC/SULFONIC/QUATERNARY AMMONIUM POLYMERS FOR USE AS SCALE AND CORROSION INHIBITORS

[75] Inventor: Gary F. Matz, Revere, Mass.

[73] Assignee: Calgon Corporation, Pittsburgh, Pa.

[21] Appl. No.: 592,769

[22] Filed: Mar. 26, 1984

[51] Int. Cl.³ ............................................. C02F 5/12
[52] U.S. Cl. .................................. 210/701; 252/180; 252/391; 422/16; 422/17
[58] Field of Search ............................ 210/698–701; 252/180, 181, 391; 422/14, 16, 17

[56] References Cited

U.S. PATENT DOCUMENTS

| | | | |
|---|---|---|---|
| 3,658,710 | 4/1972 | Puckorius | 210/698 |
| 3,752,761 | 8/1973 | Boothe et al. | 210/698 |
| 3,806,367 | 4/1974 | Lange et al. | 210/701 |
| 3,928,196 | 12/1975 | Persinski et al. | 210/58 |
| 4,271,058 | 6/1981 | Trabitzsch et al. | 210/701 |
| 4,460,477 | 7/1984 | Costello et al. | 210/701 |

*Primary Examiner*—Peter Hruskoci
*Attorney, Agent, or Firm*—Michael C. Sudol; R. Brent; William C. Mitchell

[57] ABSTRACT

The instant invention is directed to a process for inhibiting corrosion and the formation and deposition of scale in aqueous systems, comprising adding to the system at least 0.1 ppm of a water-soluble polymer having an intrinsic viscosity of 0.05 to 2.5, prepared from:

(a) 50 to 90%, by weight, of an unsaturated carboxylic acid, or its salt;

(b) 5 to 40%, by weight, of an unsaturated sulfonic acid, or its salt; and (c) 5 to 40%, by weight, of an unsaturated quaternary ammonium compound.

The instant invention is also directed to a water soluble polymer, having an intrinsic viscosity of 0.05 to 2.5 prepared from:

(a) 50 to 90%, by weight, of an unsaturated carboxylic compound selected from the group consisting of acrylic acid, methacrylic acid, their salts and mixtures thereof;

(b) 5 to 40%, by weight, of an unsaturated sulfonic compound selected from the group consisting of 2-acrylamido-2-methylpropylsulfonic acid, 2-methacrylamido-2-methylpropyl sulfonic acid, their salts and mixtures thereof; and (c) 5 to 40%, by weight, dimethyl diallyl ammonium chloride, diethyl diallyl ammonium chloride and mixtures thereof.

2 Claims, No Drawings

CARBOXYLIC/SULFONIC/QUATERNARY AMMONIUM POLYMERS FOR USE AS SCALE AND CORROSION INHIBITORS

BACKGROUND OF THE INVENTION

U.S. Pat. No. 3,928,196 discloses the use of a copolymer of 2-acrylamido-2-methylpropylsulfonic acid and acrylic acid in inhibiting scale.

Most industrial waters contain alkaline earth metal cations, such as calcium, barium, magnesium, etc. and several anions such as bicarbonate, carbonate, sulfate, oxalate, phosphate, silicate, fluoride, etc. When combinations of these anions and cations are present in concentrations which exceed the solubility of their reaction products, precipitates form until these product solubility concentrations are no longer exceeded.

For example, when the concentrations of calcium ion and carbonate ion exceed the solubility of the calcium carbonate reaction products, a solid phase of calcium carbonate will form.

Solubility product concentrations are exceeded for various reasons, such as partial evaporation of the water phase, change in pH, pressure or temperature, and the introduction of additional ions which form insoluble compounds with the ions already present in the solution.

As these reaction products precipitate on surfaces of the water carrying system, they form scale or deposits. This accumulation prevents effective heat transfer, interferes with fluid flow, facilitates corrosive processes, and harbors bacteria. This scale is an expensive problem in many industrial water systems causing delays and shutdowns for cleaning and removal.

Scale-forming compounds can be prevented from precipitating by inactivating their cations with chelating or sequestering agents, so that the solubility of their reaction products is not exceeded. Generally, this requires large quantities of chelating or sequestering agent as cation, since chelation is a stoichiometric reaction, and these amounts are not always desirable or economical.

Almost 50 years ago, it was discovered that certain inorganic polyphosphates would prevent such precipitation when added in amounts far less than the concentrations needed for sequestering or chelating. By polyphosphates, we mean phosphates having a molar ratio of metal oxide:$P_2O_5$ between 1:1 and 2:1.

When a precipitation inhibitor is present in a potentially scale-forming system at a markedly lower concentration than that required for (stoichiometric) binding of the scale-forming cation, it is said to be present in "threshold" amounts. See for example, Hatch and Rice, "Industrial Engineering Chemistry", Vol. 31, pages 51 to 53 (Jan. 1939); Reitemeier and Buehrer, "Journal of Physical Chemistry", Vol. 44, No. 5, pages 535 to 536 (May 1940); Fink and Richardson, U.S. Pat. No. 2,358,222; and Hatch, U.S. Pat. No. 2,539,305.

Generally, sequestering takes place at a weight ratio of threshold active compound to scale-forming cation components of greater than about 10:1, depending on the anion components in the water. Threshold inhibition generally takes place at a weight ratio of threshold active compound to scale-forming cation components of less than about 0.5:1.0.

Certain water soluble polymers, including groups derived from acrylamide and acrylic acid have been used to condition water containing scale-forming compounds. As for example, see U.S. Pat. Nos. 2,783,200; 3,514,476; 2,980,610; 3,285,886; 3,463,730 and 3,518,204.

DESCRIPTION OF THE INVENTION

The instant invention is directed to a process for inhibiting corrosion and the formation and deposition of scale in aqueous systems, comprising adding to the system at least 0.1 ppm of a water-soluble polymer having an intrinsic viscosity of 0.05 to 2.5, prepared from:
(a) 50 to 90%, by weight, of an unsaturated carboxylic acid, or its salt;
(b) 5 to 40%, by weight, of an unsaturated sulfonic acid, or its salt; and
(c) 5 to 40%, by weight, of an unsaturated quaternary ammonium compound.

The instant invention is also directed to a water soluble polymer, having an intrinsic viscosity of 0.05 to 2.5 prepared from:
(a) 50 to 90%, by weight, of an unsaturated carboxylic compound selected from the group consisting of acrylic acid, methacrylic acid, their salts and mixtures thereof;
(b) 5 to 40%, by weight, of an unsaturated sulfonic compound selected from the group consisting of 2-acrylamido-2-methylpropylsulfonic acid, 2-methacrylamido-2-methylpropylsulfonic acid, their salts and mixtures thereof; and
(c) 5 to 40%, by weight, dimethyl diallyl ammonium chloride, diethyl diallyl ammonium chloride and mixtures thereof.

The phrase "inhibiting the formation and deposition" is meant to include threshold inhibition, dispersion, solubilization, or particle size reduction.

The word "scale" includes any scale forming in an aqueous solution. Examples include calcium carbonate, calcium sulphate, calcium phosphate, calcium phosphonate (including calcium hydroxyethylidene diphosphonic acid), calcium oxalate, barium sulphate, silica, alluvial deposits, metal oxide (including iron oxide), and metal hydroxide, (including magnesium hydroxide).

The phrase "aqueous system" is meant to include any system containing water; including, but not limited to, cooing water, boiler water, desalination, gas scrubbers, blast furnaces, sewage sludge thermal conditioning equipment, reverse osmosis, sugar evaporators, paper processing, mining circuits and the like.

Any unsaturated carboxylic acid or salt may be used to prepare the polymer. Examples include acrylic acid, methacrylic acid, α-halo acrylic acid, maleic acid, itaconic acid, vinyl acetic acid, allyl acetic acid, fumaric acid, β-carboxyethyl acrylate, their salts and mixtures thereof. The preferred carboxylic acids are acrylic acid, methacrylic acid, β-carboxyethylacrylate, maleic acid, fumaric acid itaconic acid, and their salts. The most preferred carboxylic acids are acrylic acid, methacrylic acid and their salts.

Any unsaturated sulfonic acid or salt may be used. Examples include 2-acrylamido-2-methylpropylsulfonic acid, 2-methacrylamido-2-methylpropylsulfonic acid, styrene sulfonic acid, vinyl sulfonic acid, sulfo alkyl acrylate or methacrylate, allyl sulfonic acid, methallyl sulfonic acid, 3-methacrylamido-2-hydroxy propyl sulfonic acid, sulfonic acid acrylate, their salts and mixtures thereof. The preferred sulfonic compounds are 2-acrylamido-2-methylpropylsulfonic acid, 2-methacrylamido-2-methylpropylsulfonic acid, allyl sulfonic acid, styrenesulfonic acid, vinylsulfonic acid and their salts. The most preferred sulfonic acids are 2-acrylamido-2-methylpropylsulfonic acid, 2-methacrylamido-2-methylpropylsulfonic acid and their salts.

Any quaternary ammonium compounds may be used. Examples include dimethyl diallyl ammonium chloride (DMDAAC), diethyldiallyl ammonium chloride (DEDAAC), methacryloyloxyethyl trimethyl ammonium chloride (METAC), methacryloxyloxyethyl trimethyl ammonium methosulfate (METAMS), acryloyloxyethyl trimethyl ammonium chloride (AETAC), methacrylamido propyl trimethyl ammonium chloride (MAPTAC), acryloyloxyethyl trimethyl ammonium methosulfate (AETAM), acrylamido methyl propyl trimethyl ammonium chloride (AMPTAC), and acrylamido methyl butyl trimethyl ammonium chloride (AMBTAC). The preferred quaternary ammonium compounds are DMDAAC, DEDAAC and METAC. The most preferred quaternary ammonium compounds are DMDAAC and DEDAAC.

Mixtures of the various monomers may be used. Nonionic monomers (such as acrylamide, methacrylamide and acrylonitrile) may also be present in the polymers. Terpolymers are preferred.

The polymers in the instant invention are prepared from 50 to 90%, preferably 60–75%, by weight, of an unsaturated carboxylic acid or salt; 5 to 40%, preferably 5 to 25%, by weight, an unsaturated sulfonic acid, or salt; and 5 to 40%, perferably 10 to 25%, by weight, of a quaternary ammonium compound.

The polymers may be prepared by mixing the monomers preferably in the presence of a free radical initiator. Any free radical initiator may be used. Examples include peroxides, azo initiators and redox systems. The polymerization may also be initiated photochemically. The preferred catalysts are sodium persulfate and sodium metabisulfite or a mixture of ammonium persulfate and any azo type initiator, such as 2,2'-azobis-(2,4-dimethyl-4-methoxyvaleronitrile).

The polymerization may be conducted by any of a variety of procedures, for example, in solution, suspension, bulk and emulsions.

The reaction temperature is not critical. The reaction will generally occur between 10 and 100° C., preferably 40 to 60° C. It is generally impractical to run the reaction below room temperature because the reaction is too slow. Above a temperature of 60° C., the molecular weight of the polymer tends to decrease. The reaction, depending on the temperature, generally takes from 5 minutes to 12 hours. Measuring for residual monomer will verify when the reaction is complete.

The pH of the reaction mixture is not critical. The pH is generally in the range of 3.0 to 9.0.

The percent solids in the reaction mixture is not critical. The preferred range is 1 to 50%, by weight, solids.

The polymers are usually identified by intrinsic viscosity. The intrinsic viscosity should be 0.05 to 2.5, preferable 0.05 to 0.5 dl/g, in 1.0 M sodium chloride (measured on a 75 Cannon Ubbelohde capillary viscometer).

The polymers of the instant invention are used in a minimum dosage of 0.1 ppm, preferably 0.1 to 100 ppm, most preferably 0.1 to 25 ppm.

EXAMPLES

The following abbreviations are used in the examples and are defined as indicated:
AA=acrylic acid.
AMPS=2-acrylamido-2-methylpropylsulfonic acid.
DMDAAC=dimethyldiallyl ammonium chloride.
METAC=methacryloyloxyethyl trimethyl ammonium chloride.
MAPTAC=methacrylamido propyl trimethyl ammonium chloride Polymerization The monomers were mixed in the ratios indicated in the Tables so as to make up 28% of the total solution weight. Sufficient amount of sodium hydroxide was added to neutralize the solution to pH 4.5. Sodium persulfate and sodium metabisulfite, as catalyst, were added to the neutralized monomer solution at 0.8 and 1.5 percent of the solution weight respectfully. The initiation temperature was 25° C. The polymerization was allowed to run to completion which usually took between 15 and 30 minutes at which time the reaction temperature had peaked between 80–90° C.

Intrinsic viscosities were measured in 1 M NaCl in a size 75 Cannon Ubbelohde capillary viscometer. Measurements at 2.0, 1.0, and 0.5 g/dl were taken. The Huggins equation was used to determine the intrinsic viscosity.

Calcium Carbonate Inhibition

Calcium carbonate stabilization was determined by adding a given concentration of the polymers of the instant invention to a solution containing 200 mg/l $Ca^{+2}$ (as $CaCl_2$), 600 mg/l $HCO_3^{-1}$ (as $NaHCO_3$) at pH $8.0\pm0.1$. The solution was stored in a stagnant flask for 24 hours at 60° C (140° F.). Poor performing samples allow a precipitate of $CaCO_3$ to form. To remove these 'solids' the solution is filtered through a 2.5 micron filter. The inhibitor effectiveness under these conditions is obtained by determination of the soluble calcium content of the test solutions using the Schwarzenbach titration method (EDTA, chrome black T indicator). The soluble calcium ion concentration in the absence of inhibitor is equivalent to 0% scale inhibition. The percent inhibition for a given test is determined by:

$$\frac{V_e - V_o}{V_t - V_o} \times 100 = \% \text{ inhibition}$$

$V_o$ = the Schwarzenbach titration volume with no inhibitor present (control)
$V_t$ = the Schwarzenbach titration volume when no precipitation occurs
$V_e$ = the experimental Schwarzenbach titration volume when inhibitors are present in the test solution Calcium Sulfate Inhibition Calcium sulfate stabilization was determined by adding a given concentration of the polyampholyte of the instant invention to a solution containing 4800 mg/l $Ca^{+2}$ (as $CaCl_2$) and 2000 mg/l $SO_4^{-2}$ (as $Na_2SO_4$) at pH $7.0\pm0.5$. The solution was stored in a stagnant flask for 24 hours at 60° C (140° F.). Poor performing samples allow $CaSO_4$ precipitation to occur. To remove these 'solids', the solution is filtered through a 2.5 micron filter. The inhibitor effectiveness under these conditions is obtained by determination of the soluble calcium content of the test solution using the Schwarzenbach titration method (EDTA, chrome black T indicator). The soluble calcium ion concentration in the absence of inhibitor is equivalent to 0% scale inhibition. The parent inhibition for a given test is determined by:

$$\frac{Ve - Vo}{Vt - Vo} \times 100 = \% \text{ inhibition}$$

Vo = the Schwarzenbach titration volume with no inhibitor present (control)
Vt = the Schwarzenbach titration volume when no precipitation occurs
Ve = the Experimental Schwarzenbach titration volume when inhibitors are present in the test solution Calcium Phosphate Inhibition Calcium phosphate stabilization was determined by adding a given concentration of the polyampholytes of the instant invention to a solution containing 200 mg/l $Ca^{+2}$ (as $CaCl_2$) and 9 mg/l $PO_4^{-3}$ (as $Na_2HPO_4$). The solution is buffered at pH 8.5 by adding a 16.1% solution of $NaHCO_3:Na_2CO_3$. This solution was stored for 24 hours at 60° C. (140° F.). Poor performing samples allow $CaPO_4$ precipitation to occur so the stored solutions are filtered through 2.5μ filter paper to remove 'solids'. The inhibitor effectiveness under these conditions is obtained by determination of the soluble phosphate content of the test solution using a photometric method (ascorbic acid as indicator). The range of the test is about 0 to 1.6 mg/l phosphate when the color is measured in a 1-inch cell at a wavelength of 880 nm. Higher levels can be determined by: (1) diluting the sample; (2) measuring the test color in a smaller tube or cell; and/or (3) making the color measurement at 625 nm. The percent inhibition for a given test is determined by:

$$\frac{(\text{mg/l PO}_4 \text{ in inhibitor treated flask}) - (\text{mg/l PO}_4 \text{ in control flask})}{(\text{mg/l PO}_4 \text{ theoretical (9 mg/l)}) - (\text{mg/l PO}_4 \text{ in control flask})} \times 100 = \% \text{ inhibition}$$

| Examples | Composition | | | [h] (dl/g) | $CaCO_3$ Inhibition (ppm Active) | | | $CaSO_4$ 2.5 ppm Active | $CaPO_4$ Inhibition (ppm Active) | |
|---|---|---|---|---|---|---|---|---|---|---|
| | AA | AMPS | Quaternary Ammonium | | 1.5 | 2.0 | 2.5 | | 5.0 | 10.0 |
| | | | DMDAAC | | | | | | | |
| 1 | 70 | 20 | 10 | 0.29 | 58 | 72 | 72 | 86 | 9 | 100 |
| 2 | 70 | 10 | 20 | 0.12 | 89 | 100 | 100 | 84 | 1 | 100 |
| 3 | 60 | 30 | 10 | 0.23 | 56 | 68 | 68 | — | 24 | 100 |
| 4 | 60 | 20 | 20 | 0.15 | 100 | 100 | 100 | 52 | 0 | 100 |
| 5 | 60 | 10 | 30 | 0.18 | 88 | 88 | 91 | — | 8 | 51 |
| 6 | 50 | 40 | 10 | | 44 | 44 | 63 | | 11 | 100 |
| 7 | 50 | 25 | 25 | | 60 | 60 | 74 | | 4 | 100 |
| 8 | 50 | 10 | 40 | | 79 | 90 | 92 | | 1 | 13 |
| | | | METAC | | | | | | | |
| 9 | 60 | 20 | 20 | 0.24 | 60 | 62 | 62 | | 6 | 77 |
| | | | MAPTAC | | | | | | | |
| 10 | 60 | 20 | 20 | 0.27 | 27 | 33 | 40 | | 6 | 84 |

What is claimed is:
1. A process for inhibiting the formation and deposition of scale in aqueous systems, said scale including calcium carbonate, calcium sulfate or calcium phosphate, and mistures thereof, comprising adding to the system at least 0.1 ppm of a water-soluble polymer having an intrinsic viscosity of 0.05 to 0.5 dl/g, prepared from:
(a) 60 to 75%, by weight, of an unsaturated carboxylic compound selected from the group consisting of acrylic acid, methacrylic acid and their salts;
(b) 5 to 25%, by weight, of an unsaturated sulfonic compound selected from the group consisting of 2-acrylamido-2-methylpropyl sulfonic acid, 2-methacrylamido-2-methylpropyl sulfonic acid and their salts; and
(c) 10 to 25%, by weight, of an unsaturated quaternary ammonium compound selected from the group consisting of dimethyl diallyl ammonium chloride and diethyl diallyl ammonium chloride.
2. The process of claim 1, wherein 0.1 to 25 ppm of polymer is added.

* * * * *